July 25, 1939.　　　　G. B. DUFFIELD　　　　2,167,433
AIR VENT VALVE
Filed May 4, 1936　　　　2 Sheets-Sheet 1
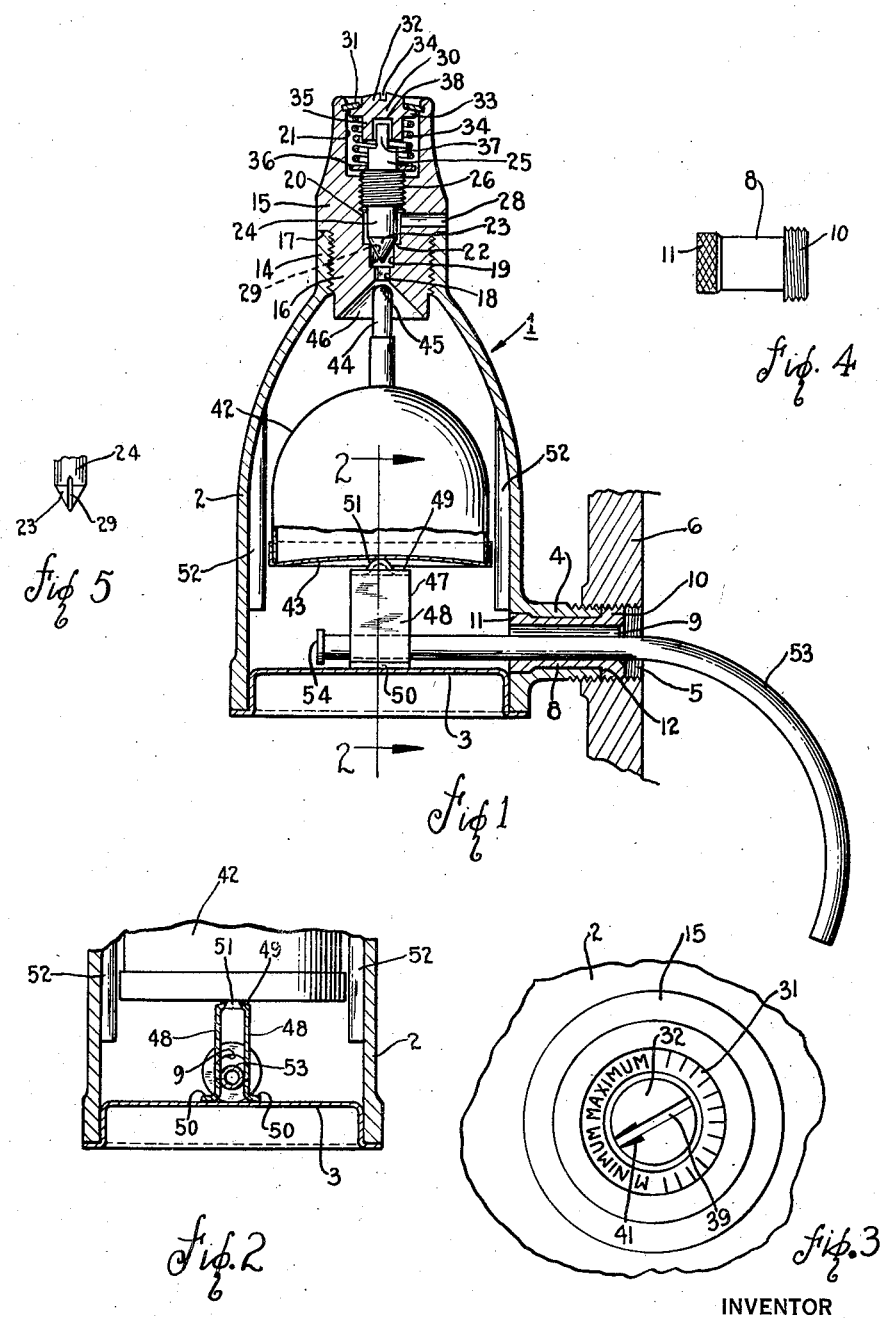
INVENTOR
George Bethune Duffield
BY
Andrew K. Foulds
his ATTORNEY July 25, 1939.　　　G. B. DUFFIELD　　　2,167,433
AIR VENT VALVE
Filed May 4, 1936　　　2 Sheets-Sheet 2
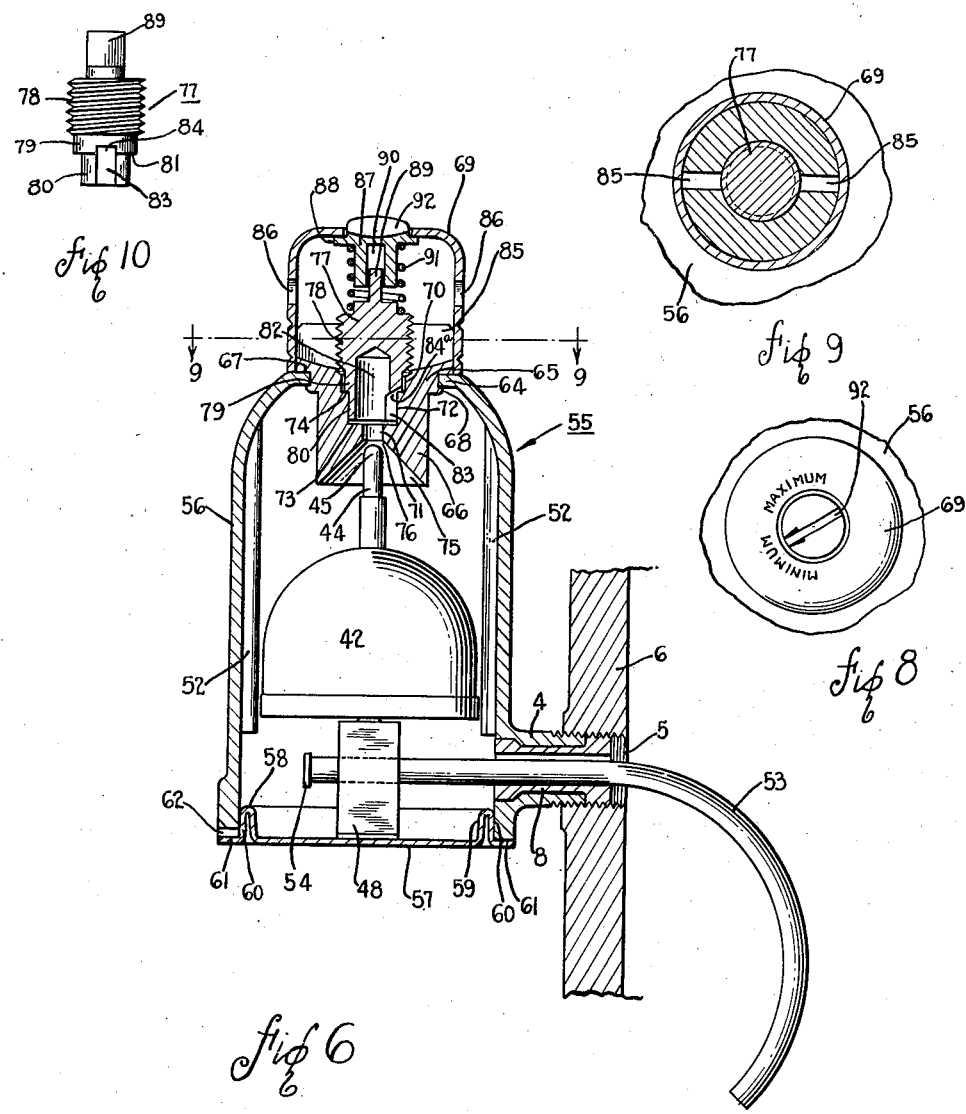

Patented July 25, 1939

2,167,433

UNITED STATES PATENT OFFICE 2,167,433

AIR VENT VALVE

George Bethune Duffield, Detroit, Mich., assignor to Detroit Lubricator Company, Detroit, Mich., a corporation of Michigan Application May 4, 1936, Serial No. 77,689

19 Claims. (Cl. 236—63)

My invention relates generally to valves and more particularly to air vent valves for the radiators of heating systems.

One of the objects of my invention is to provide a new and improved air vent valve for heating systems and one which has a strong, leak-proof, yet economically constructed casing.

Another object of my invention is to provide in an air vent valve a new and improved body having a nipple formed integral therewith and die cast so as to provide the body at low manufacturing cost, and to provide a body of this character the nipple of which can be tightly threaded into a wall of a radiator without danger of being broken or twisted off when so doing.

Another object of my invention is to provide an air vent valve having a die cast body formed with an integral nipple for connection in the heating medium flow line of a heating system and to provide an insert member for reinforcing the nipple against breakage.

Another object of my invention is to provide a new and improved valve of the above mentioned character having a nipple and a reenforcing insert therefor, so arranged and constructed that fluid will not leak from the radiator in the event the nipple and its insert do not have a fluid tight joint therebetween.

A further object of my invention is to provide an air vent valve having a new and improved manual adjustment means for varying or regulating the capacity of the air outlet port.

The invention consists in the improved construction and combination of parts, to be more fully described hereinafter and the novelty of which will be particularly pointed out and distinctly claimed.

In the accompanying drawings, to be taken as a part of this specification, I have fully and clearly illustrated my invention, in which drawings—

Figure 1 is an enlarged view shown in vertical central cross section through the casing of my air vent valve and showing parts of the device in elevation in the casing;

Fig. 2 is a fragmentary view shown in cross section of my device and taken along the line 2—2 of Fig. 1;

Fig. 3 is an enlarged fragmentary top plan view of my air vent valve;

Fig. 4 is a view shown in side elevation of one of the parts of my air vent valve;

Fig. 5 is a detail of a valve member;

Fig. 6 is a view of a modified form of my air vent valve;

Fig. 7 is a fragmentary view in elevation showing a detail of the valve casing construction;

Fig. 8 is a fragmentary top plan view of the valve shown in Fig. 6;

Fig. 9 is a view shown in cross section and taken along the line 9—9 of Fig. 6, and Fig. 10 is a view shown in elevation of a valve member employed in the valve of Fig. 6.

Referring to the drawings by characters of reference the numeral 1 designates in general the casing or housing of my air vent valve, the construction of the casing preferably including a hollow, bell-shaped body portion 2. The body 2 is preferably a casting and is formed having its lower or larger end open to provide for the placement in the body of certain parts which are hereinafter described in detail. The lower open end of the body 2 may be closed by a wall means such as a sheet metal plate 3 which forms the bottom wall of the casing 1. The body 2 and the plate or bottom wall 3 may be secured together in any suitable manner such that the joint therebetween will be fluid tight. Cast integral with the body 2 there is an externally extending tubular member or nipple 4 for screw threading into an aperture 5 in a wall 6 of a radiator to attach the vent valve to the radiator.

The body 2 is preferably constructed by a die casting operation in order to manufacture the same economically. However, one of the objections to constructing air vent valve bodies by a die casting operation is that the die cast metal forming the body and nipple is not, in many instances, strong enough to withstand the strain that it is sometimes subjected to when screw-threading the nipple into a wall of a radiator. As is well known, the nipple must be screw-threaded in the wall of a radiator until the cooperating pipe threads engage or bind in order to obtain a leak-proof connection, but in tightening the connection it frequently occurs that the nipple is twisted off, rendering the device useless. This usually occurs when it is necessary to give the nipple a part of a turn after the threads are engaged in order to position the valve in its normal upright position.

In order to provide a valve body which can be die cast and thus be economically manufactured, and yet one whose nipple will not be liable to break off when attaching the valve to a radiator, I provide a tubular metallic, open ended insert 8 for reenforcing the nipple 4, the insert having a central passage 9 therethrough for the passage of fluid from a radiator into the interior of casing 1. The reenforcing member 8 is preferably constructed from brass rod stock but may be constructed of any other suitable reenforcing material. The tubular reenforcing member 8 is formed having an enlarged outer end portion, as at 10, and is also preferably formed having a slightly enlarged inner end portion, as at 11. When casting the body 2 the reenforcing plate 8 is positioned in the die so that its inner end will open through the side wall of body 2 and the nipple 4 is cast around the outer periphery of the reduced portion of the insert member 8 to thus provide a good fluid-tight joint therebetween. The wall thickness of the cast nipple 4 is preferably made such that its outer surface will be flush with the outer surface of the enlarged outer end portion 10 of the insert member 8 so as to provide an unbroken outer surface for threading. The cast metal of the nipple 4 joins the shoulder formed between the reduced portion and the enlarged end portion 10 of the insert member and forms therewith a fluid-tight, sealed joint, as at 12. The inner end of the insert member 8 preferably terminates substantially flush with the inner wall surface of the body 2, or at least extends sufficiently beyond or inward of the point where the nipple 4 joins the wall of the body 2 so as to reenforce the cast nipple at this point. The outer surface of the enlarged inner end portion 11 of the insert member 8 is preferably knurled, as shown in Fig. 4, or otherwise roughened to improve the adherence between its outer surface and the cast metal nipple 4, to give added strength and to provide for a good fluid-tight connection therebetween. The portion 10 of the insert member 8 constitutes an extension of the nipple 4 and their combined outer surfaces preferably taper uniformly, with the extension and a portion of the nipple provided with an external pipe thread. By having the end portion 12 of the reenforcing member providing an extension for the cast nipple, with both the extension and the nipple threaded for connection to a radiator wall, a strong connection is provided which will not be liable to break. The nipple is so designed that when it is in tight threaded engagement with the wall 6 of the radiator, the joint 12 between the end of the nipple and its extension locates within the threaded aperture, or at a point between the outer and inner wall surfaces of the wall 6. The cooperating pipe threads are designed so that only threads on the cast nipple bind with cooperating threads of the aperture 5 so as to seal the aperture at a point outwardly of the joint 12. By arranging for the joint 12 to be within the aperture 5 and for the sealing of the aperture 5 at a point outwardly of the joint, it will be seen that should the insert ever become loosened from the nipple, fluid would not leak on the floor but instead would pass between the inner wall surface of the nipple 4 and the outer wall surface of the insert 8, and into either the casing 1 or the radiator.

The bell-shaped body 2 is preferably cast having a reduced upper end portion or neck 14 which is preferably tubular in shape and open at its upper end. Mounted on the upper end of the body 2 there is a removable cylindrical-shaped valve housing member 15 which has an externally threaded shank portion 16 for screw threading into the tubular portion or neck 14 and which closes the upper open end of the body 2. Preferably the housing member 15 is formed with a downwardly facing annular shoulder 17 for seating on the upper end of the tubular shaped portion or neck 14. The valve housing 15 is bored centrally and longitudinally therethrough and preferably counterbored to provide it with four axially aligned different sized bores 18, 19, 20 and 21, with the bores increasing in size respectively from the smallest bore 18 which opens through the inner end of housing 15 and into the casing 1, to the largest bore 21 which opens through the upper end of the housing member 15. The intersection of the bores 19 and 20 provides a valve port and seat 22 for cooperation with the conical face 23 of a valve member 24 which is disposed in bore 20 and has an upper end portion 25 extending into bore 21.

An upper end portion of the wall defining bore 20 is threaded to receive an externally threaded enlarged portion 26 provided on the valve member 24. The portion of the valve member 24 between its enlarged threaded portion 26 and its conical face 23 is relatively smaller than the diameter of bore 20 to provide an annular space therebetween for the passage of air. In the valve housing 15 and intersecting bore 20 at a point below its threaded portion there is a laterally extending bore 28 which opens through the outer wall of the valve housing for the passage of air to atmosphere. Extending along the conical face 23 of the valve 24 there is a small slot 29 which provides for minimum flow capacity for the escape of air to atmosphere when the valve member 24 is seated, see Fig. 5.

In order to provide for adjusting the valve member 24 so as to accurately position it to obtain a desired flow capacity through port or passage 18 and for doing so from externally of the casing without the necessity of removing a cap or other closure means, I provide a rotatable adjustment member 30 and a dial member or plate 31 therefor and arrange the adjustment and dial members at the top of the housing 15 in bore 21 and in a manner so that the dial is visible and the adjustment member readily accessible. The dial plate 31 is preferably in the form of a flat ring and may be secured to the housing 15 by having a border portion of its outer periphery clamped in an annular recess provided in bore 21 adjacent the upper end thereof. The dial plate 31 has a central aperture and the adjustment member 30 has an upper end portion 32 which projects therethrough, the upper end face of the adjustment member preferably being substantially flush with the upper end of valve housing 15. The dial plate 31 also serves as an abutment member for the adjustment member 30 which has an external annular flange 33 whose upper face abuts the underside of the dial member 31 and is held thereagainst by a coil spring 34 which is under compression and located in bore 21. The coil spring 34 surrounds the upper end portion 25 of the valve member 24 and also surrounds a depending portion 35 of the adjustment member 30, the spring 34 having its upper end abutting the underside of the annular flange 33 of the adjustment member and its lower end abutting a washer 36 which seats on the upwardly facing shoulder formed between portion 25 and the enlarged threaded portion 26 of the valve 24. The spring 34, in addition to holding the adjustment member 30 in its proper position, also serves to maintain the adjustment member in frictional engagement with the underside of the dial plate 31 and under a force such that the adjustment member will not be too easily rotatable. The spring 34 also prevents longitudinal movement of the valve and resultant variation in port capacity which thread clearance might otherwise permit when the pressure of the air acts against the valve. An upper end portion of the valve member 24 is provided with oppositely disposed flattened sides to provide a key 37, and the lower end of the adjustment member 30 is provided with a slot or keyway 38 for receiving the key 37 whereby the valve may be rotated upon rotating the adjustment member 30 through the engagement of the side walls of slot 38 with the flattened sides of the key 37. In the upper or outer end of the adjustment member 30 there is preferably provided a slot 39 for receiving a coin or screw driver for rotating the adjustment member and valve member. The dial member 31 is provided on its outer or upper end face with a pointer 41 for cooperation with indicia on the dial to determine the flow or venting capacity setting of the valve. In the present instance the indicia on the dial 31 includes the words "maximum" and "minimum" which are located relatively close together on the dial, it being necessary to rotate the adjustment member 30 substantially one complete turn to change the valve setting from minimum to maximum and vice versa. Between the words "maximum" and "minimum" the dial may be provided with a plurality of spaced radial lines for indicating different valve settings between the extremes of maximum and minimum. When the valve member 24 is seated as shown in Fig. 1, minimum flow capacity will be had through bore 18, as previously mentioned, by reason of the small slot 29 along the face 23 of the valve, and when the valve is seated the pointer 41 on the adjustment member 30 will be pointing to the word "minimum" on the dial, as shown in Fig. 3. When the adjustment member 30 is rotated in a counterclockwise direction, as seen in Fig. 3, the valve member 24 will be moved away from its seat and the spring 34 will be compressed. When the spring 34 has been compressed such that its coils engage, the valve will have been moved away from its seat and full flow capacity will be had through the venting bore 20, the spring thus serving as a stop member to limit upward movement of the valve member 24.

Disposed in the casing 1 there is a combined float and temperature responsive element, designated in general by the numeral 42, which element operates to prevent the escape of fluid other than air through bore 18. The combined float and temperature responsive element 42 may be of any suitable type and, in the present instance, includes a container having a flexible bottom wall 43. Integral with the container and extending upwardly therefrom there is a valve member 44 which preferably has an upper rounded end 45 for cooperation with the seat of port or bore 18 to prevent the passage of steam or water of condensation through bore 18. Preferably the lower end of the housing member 15 is provided with a conical-shaped recessed wall 46 which converges upwardly to and intersects bore 18 and serves to guide the valve member 44 toward the port of bore 18. Disposed within the body 2 and supported on the bottom wall 3 there is a supporting member 47 for the combined float and temperature responsive element 42. The supporting member 47 is preferably constructed of a strip of sheet metal and is of general U-shape, having vertically extending parallel sides 48 connected by a horizontal extending upper end portion 49, the sides 48 having outturned flanges 50 at their lower ends which may be welded or otherwise suitably secured to the bottom wall 3. In the upper end or horizontal portion 49 of the U-shaped supporting member 47 there is preferably provided an upwardly extending, embossed or raised portion 51 to provide a small surface contact point for engagement with, and at the center of, the flexible bottom wall 43 of the combined float and temperature responsive element 42. The container of the element 42 contains a quantity of a suitable expansible-contractible temperature responsive fluid such as alcohol which, when in its contracted state, permits the flexible wall 43 of the element 42 to flex upwardly or inwardly, as shown in Fig. 1. In this position the rounded end 45 of the valve member 44 is disposed slightly below or away from its seat, and bore 18 is open to flow therethrough. To guide the element 42 in its reciprocal movement, I cast the body 2 with ribs 52 which extend vertically along the inner wall of the body 2. A siphon tube 53, of the usual type, is provided for the return of water from casing 1 to the radiator. The tube 53 has an end portion which extends through the tubular insert member 8 into the casing 1, the outer end portion of the tube 53 extending into the radiator. The inner end of the siphon tube 53 extends between and beyond the parallel sides 48 of the U-shaped supporting member and is preferably provided with an enlarged end, as at 54, which is engageable with the parallel sides 48 for securing the tube within the insert member 8.

The operation of my air vent valve is as follows: When the radiator to which the valve is attached is cold, the valve of the thermostatic float will be in the position shown and the passage or bore 18 will be open to flow therethrough. When steam enters the radiator it forces ahead of it the air which has accumulated in the radiator sections and the air passes through the tubular insert 8 into the casing 1 from whence it flows to atmosphere through outlet passage or bore 28. However, as soon as the steam following the air strikes the thermostatic float 42, the heat of the steam volatilizes the liquid in the thermostatic float and the pressure exerted by the liquid flexes the flexible wall 43 downwardly or outwardly which causes the valve member 44 to be raised and close bore 18 against the passage of steam therethrough. It sometimes happens during the escape of air from the radiator that the water of condensation in the radiator surges up therein and tends to flow out through the air vent valve. When this occurs the water in the casing 1 floats the thermostatic float 42 which rises with the water until the valve member 44 closes the bore 18 to prevent the passage of the water therethrough, the float remaining up until the water recedes. The water of condensation in a radiator during the admission of steam therein surges back and forth and upon the rearward or inward surge of the water it will be siphoned out of the valve through the siphon tube 53 and at the same time air will pass into the casing 1 through the passage in the insert 8 around the tube 53.

Air vent valves having provision for adjusting their air venting capacity are desirable for heating systems of the so-called one pipe system and particularly for such systems which have short automatic firing periods, for such valves provide for the equal distribution of steam to the radiators. By employing air vent valves having adjustable venting capacities, equal distribution of the steam can be had to the radiators of a system by properly adjusting the valves in accordance with their positions in the line. In order to obtain equal distribution of steam to the radiators in a system, the valves are adjusted so that their venting ports successively increase in capacity from the valve of the first radiator in the line to the valve in the last radiator in the line. In certain installations it may be found necessary, in order to balance the system, to set the valve of the first radiator for minimum venting capacity and the valve of the last radiator for maximum venting capacity. When steam enters the first radiator in the line and forces ahead of it the air which has accumulated in the radiator, the air by reason of the minimum capacity flow setting of the valve exerts a back force opposing the entrance of the steam into the radiator with the result that some of the steam takes the path of least resistance, which is to the second radiator in the line. The steam thus flows to successive radiators meeting with less and less air resistance until it reaches the last radiator where it meets with the least resistance, due to the maximum flow setting of the valve of the last radiator, and in this manner equal distribution of the steam is obtained.

Referring now to Figs. 6 to 10, which show a modified form of my air vent valve, the numeral 55 designates in general the casing of the valve, the casing including a body 56 which, like the body 2 of the previously described valve, is preferably formed by a die casting operation. The body 56 is of general cylindrical shape in this instance, and has a nipple 4 cast integral therewith and reenforced by a tubular insert member 8, the nipple and its reenforcing member being the same in construction as those shown in the valve of Fig. 1. The body 56 is cast having its lower end open so as to provide for the placement of certain of the valve parts within the body, and a readily detachable closure member 57 is provided for closing the opening in the body. The closure member 57 forms the bottom wall of the casing 55 and seating thereon within the casing is a U-shaped supporting member 48 on the upper end of which the thermostatic float 42 is adapted to seat, the supporting member and thermostatic float being the same in construction and operation as those of the device shown in Fig. 1. The U-shaped supporting member 48 may be soldered or otherwise suitably secured to the detachable closure plate or bottom wall 57 of the casing. The closure member 57 is a plate-like member preferably constructed of spring sheet metal, and is formed having an annular flange 58 spaced from the outer periphery of the closure plate, the flange 58 being adapted to position within the lower end of the body 56. The annular flange 58 is formed by an annular bent portion 59 and an annular rebent portion 60 which surrounds the bent portion 59 and joins an annular outer border portion 61 which is adapted to seat against the lower end wall of the body 56. The closure member 57 is constructed with the rebent portion 60 in spaced relation to the bent portion 59, with the rebent portion having a larger outer periphery or diameter than the inner periphery or diameter of the body 56 so that the closure member can be sprung into place in the lower end of the body. The annular rebent portion 60 engages the inner wall surface of the body 56 and is held under tension to thus frictionally secure the closure member to the body and to provide a good fluid tight joint between the closure member and the body. It is well known that die castings sometimes tend to increase in size with age, or grow as it is commonly referred to, and as a result of this growth, press fitted closure plates have, in the past, become loosened from the bodies. When this occurs the valve casing is no longer leak-proof, which is of course objectionable. In addition, the bodies of air vent valves expand and contract in accordance with their temperature, which also tends to loosen press fitted closure plates. However, it will be seen that my closure plate will remain tightly secured to the body in the event that the body grows, for the periphery of the tensioned rebent portion 60 will expand circumferentially as the circumference of the inner wall of the body increases. In the side wall of the body 56, adjacent its lower end, I provide an aperture 62 in the form of a slot for receiving a screw driver or other tool for prying the closure member from the body. The closure member 57 can thus be easily and quickly detached from the body 56 to give ready access to the interior of the body.

The body 56 has a top wall 64 on which is mounted an adjustable vent valve, the valve including a tubular valve seat member 65. The top wall 64 is provided with a centrally located aperture for receiving the valve seat member 65 which has a lower end portion 66 extending downwardly into the body 56. The valve seat member 65 may be formed having an external annular shoulder 67 for seating on the outer upper face of the top wall 64, and the valve seat member may be secured to the wall by clamping the wall between the shoulder 67 and an annular portion 68 by peening over the portion 68. Fitting over the upper end portion of the valve seat member 65 there is a cap member 69 which cooperates with the valve seat member to provide a housing for a valve member and cooperating parts which are hereinafter described. The cap 69 may be welded or otherwise suitably secured to the valve seat member. The valve seat member 65 is centrally and longitudinally bored and includes a relatively large bore 70 opening through the upper end of the valve seat member, a relatively small bore 71 which opens into the body 56, and a connection bore 72 of intermediate diameter. The bores 70, 71 and 72 are axially aligned, intersecting bores and where the bore 71 intersects bore 72 an upwardly facing shoulder 73 is provided and where bore 72 intersects bore 70 an upwardly facing seating surface or shoulder 74 is provided. The lower end of the valve seat member 65 is provided with a conical-shaped recessed wall 75 which tapers upwardly and intersects bore 71 providing a valve seat 76 for cooperation with the valve member 44 of the thermostatic float 42 to prevent the passage of fluid other than air through passage or bore 71.

The relatively large bore 70 of the valve seat member 65 has an upper end portion which is internally threaded for receiving a valve member 77 which has an externally threaded portion 78 intermediate its ends for screw threading into bore 70. Below the threaded portion 78 the valve member 77 is provided with a reduced portion 79 and a lower end portion of the valve member is further reduced, as at 80, and slidably fits into bore 72. Between the reduced portions 79 and 80 of valve member 77 there is provided a downwardly facing annular seating surface or shoulder 81 which is adapted to seat on the upwardly facing annular shoulder 74 formed between bores 70 and 71. When the valve member 77 is seated, as shown, the lower end thereof is preferably spaced from the upwardly facing shoulder 73 and the outer periphery of the reduced portion 79 is preferably spaced from the periphery of the lower or unthreaded end portion of bore 70 providing an annular passage therebetween. The valve member 77 is provided with a recess or bore 82 longitudinally thereof which opens through the lower end of the valve member and terminates intermediate the ends of the valve member. In the side wall of the valve member 77, adjacent its lower end, there is provided a slot 83 which intersects bore 82 and this slot is positioned so that when the valve member is seated, as shown, there will be a small upper portion of the slot above shoulder 81, as at 84, providing a passage 84ᵃ opening into bore 70 for minimum air flow capacity. As the valve member 77 is raised or moved away from its seat 74, more of the slot 83 is disposed above the valve seat 74 and the flow capacity of the passage 84ᵃ is correspondingly increased. In the upper end of the valve member 77 there is provided a transversely extending slot 85 which intersects with bore 70 so that there is an open passageway for air through bores 71, 82, slot 83, bore 70 and slot 85 into the interior of cap 69. The cap 69 may be provided with apertures 86 in its side wall for the egress of air to atmosphere.

The top wall of the cap 69 is provided with a centrally located aperture through which extends an upper end portion of an adjustment member 87 which preferably projects slightly above the top wall of the cap 69. The adjustment member 87 is provided with an external annular flange 88 which is adapted to abut the underside of the top wall of cap 69. An upper end portion of the valve member 77 is provided with an extended reduced portion 89 which preferably has oppositely disposed flattened side portions to provide a key, and the lower end of the adjustment member 87 is provided with a slot or keyway 90 for loosely receiving the key 89 whereby the valve member may be rotated by rotating the adjustment member through engagement of the side walls of slot 90 with the flattened sides of the key 89. A coil spring 91 surrounds the lower end of the adjustment member 87 and the extended portion or key of the valve member, with one end abutting a shoulder on the valve member and the other end abutting the underside of the annular flange 88 of the adjustment member. The coil spring 91 is under compression and holds the adjustment member in place against the top wall of the body 56. Like the spring 34 of the device of Fig. 1, the spring 91 also prevents the adjustment member from being too easily rotated and prevents movement of the valve member by the pressure of the air which might otherwise occur due to thread clearance. In the upper or outer end of the adjustment member 87 there may be provided a slot 92 for receiving a coin or screw driver by means of which the adjustment member 87 and valve member 77 may be rotated. The indicia for indicating the setting of the valve member is on the outer top surface of the cap member 69 instead of on a separate dial plate, as was the case in the device of Fig. 1. The operation of the air vent valve of Fig. 6 is the same as the operation of the air vent valve shown in Fig. 1.

To adjust my valves it is only necessary to rotate the adjustment members until the pointers thereof point to the mark of the indicia designating the venting capacity desired. By providing an adjustment means located in the upper end of the valve casing it will be understood that the dial is conveniently visible and that the adjustment member is readily accessible without the necessity of removing a cap to obtain access to the same. Furthermore, it will be appreciated that I have provided an air vent valve having a new and improved body of strong leak-proof, yet economical construction. In addition, it will be appreciated that I have provided an air vent valve having a closure member of inexpensive construction for closing an opening in a wall of the valve body in a fluid tight manner without the necessity of screws, or other attaching means. Also, it will be seen that my closure member is readily attachable and/or detachable from the body.

What I claim and desire to secure by Letters Patent of the United States is:

1. In an air vent valve for a heating system, a casing including a die cast body portion, said casing having an air outlet port, temperature responsive means controlling said port and operable to prevent the escape of steam through said outlet port, said body portion having a tubular externally extending nipple die cast integral therewith, said nipple being threaded for threaded connection with a radiator of the system, and a tubular insert member defining the inner wall of said nipple for reenforcing the nipple against breakage, said nipple being cast around said insert to provide a fluid tight fit therebetween.

2. In an air vent valve for a heating system, a casing including a hollow cast body portion, said casing having an air outlet port, temperature responsive means for controlling said port to prevent the passage of the heating medium therethrough, said body portion having an externally extending nipple cast integral therewith and having a passage therethrough opening through the inner wall of said body, and a tubular member around which the wall of said nipple is cast whereby to reenforce said nipple against breakage, said tubular member having external annular flanges, said nipple being externally threaded for screw-threading into the heating medium flow line of a heating system.

3. In an air vent valve for a heating system, a casing including a hollow cast body portion, said casing having an air outlet port, temperature responsive means for controlling said port to prevent the passage of the heating medium therethrough, said body portion having an externally extending nipple cast integral therewith having a passage therethrough opening through the inner wall of said body, and a tubular member around which the wall of said nipple is cast whereby said tubular member serves to reenforce said nipple against breakage, said tubular member having an external annular flange on its outer end providing a shoulder against which the outer end of said nipple joins, said nipple and said flange being externally threaded for screw-threading into a radiator of a heating system.

4. In an air vent valve for a heating system, a casing including a hollow cast body portion, said casing having an air outlet port, means in said casing for controlling said port to prevent flow of the heating medium therethrough, said body having an externally extending nipple cast integral therewith, and a tubular insert member around which said nipple is cast to reenforce the nipple against breakage, said insert member having an enlarged outer end portion extending beyond said nipple, said outer end portion and said nipple being externally substantially cylindrical and of substantially the same external diameter such that said nipple and said portion may have a continuous external screw thread, the joint between the enlarged end portion and the outer end of said nipple being located so as to position inwardly of the outer wall surface of the wall of a radiator into which said nipple is to be tightly screw threaded.

5. In an air vent valve, a casing including a body portion having an inlet for connection to a radiator of a heating system and having an opening in its upper end, a valve housing mounted on the upper end of said body portion and closing said opening, said valve housing having a port in communication with the interior of said body and through which air passes, means in said body operable to prevent flow of steam and water through said port, said valve housing having a valve port in communication with said first-named port and through which air flows enroute to atmosphere, said valve housing having an open upper end, a rotatable valve member cooperable with said second-named port to control flow therethrough, said valve member being adjustable to vary the flow capacity of said second-named port and having an upwardly extending portion provided with a key, a dial member disposed adjacent the upper open end of said valve housing and having indicia on its upper face visible from externally of said valve housing, said dial member having a central aperture therethrough, a rotatable adjustment member disposed in said valve housing and having an upper end portion projecting through the aperture in said dial member and an enlarged portion for bearing against the underside of said dial member, said adjustment member having a depending portion provided in its lower end with a keyway for cooperation with the key of said valve member, the upper end of said adjustment member being provided with pointer means cooperable with the indicia on said dial member to determine the flow capacity of said second-named port, and a spring maintaining said adjustment member against the underside of said dial member.

6. In an air vent valve, a casing including a body portion having an inlet for connection to a radiator of a heating system and having an opening in its upper end, a valve housing mounted on the upper end of said body portion and closing said opening, said valve housing having a port in communication with the interior of said body and through which air passes, means in said body operable to prevent flow of steam and water through said port, said valve housing having a valve port in communication with said first-named port and through which air flows enroute to atmosphere, said valve housing having an open upper end, a rotatable valve member cooperable with said second-named port to control flow therethrough, said valve member being adjustable to vary the flow capacity of said second-named port and having an upwardly extending portion provided with a key, a dial member disposed adjacent the upper open end of said valve housing and having indicia on its upper face visible from the exterior of said valve housing, said dial member having a central aperture therethrough, a rotatable adjustment member disposed in said valve housing and having an upper end portion projecting through the aperture in said dial member and an enlarged portion for bearing against the underside of said dial member, said adjustment member having a depending portion provided in its lower end with a keyway for cooperation with the key of said valve member, the upper end of said adjustment member being provided with pointer means cooperable with the indicia on said dial member to determine the flow capacity of said second-named port, and a coil spring under compression having one end bearing against said valve and the other end bearing against said adjustment member to maintain said adjustment member in engagement with said dial member, said coil spring also serving when completely compressed to limit opening movement of said valve member.

7. An air valve of the character described comprising a die cast hollow body member having its upper and lower ends open, a plate member fitting within said lower open end and sealing the bottom of said body member, a tubular inlet member cast integral with said body member and projecting laterally from the lower portion thereof, a reenforcing tubular insert member cast in said inlet member and having an end portion projecting therefrom, said projecting portion being screw threaded for engagement with an internally threaded aperture, a siphon tube extending through the bore of said insert member, a supporting member mounted on said plate member and securing said siphon tube within said insert member, a longitudinally movable thermostatic float within said body member and seating on said supporting member, said body member having longitudinally extending internal guide ribs cast integral therewith and cooperable with and for guiding said float, the open upper end portion of said body member terminating in a tubular cylindrical neck, a closure member sealing the open upper end of said body member and screw threaded into said neck, said closure member having a vent port, and a valve member carried by said float and controlling said port.

8. An air valve of the character described comprising a hollow casing, a valve housing closing one end of said casing, said housing having a passageway therethrough, a valve in said casing and controlling said passageway, a valve member adjustably screw threaded in said housing and controlling said passageway, said housing having a chamber, a stem on said valve member extending into said chamber, a plate member overlying said stem and closing said chamber, said plate member having an aperture therethrough concentric with said stem, an operating member rotatably supported in said aperture and extending therethrough, and means operatively connecting said operating member and said stem.

9. An air valve of the character described comprising a hollow casing, a valve housing closing one end of said casing, said housing having a passageway therethrough, a valve in said casing and controlling said passageway, a valve member adjustably screw threaded in said housing and controlling said passageway, said housing having a chamber, a stem on said valve member extending into said chamber, a plate member overlying said stem and closing said chamber, said plate member having an aperture therethrough concentric with said stem, an operating member rotatably supported in said aperture and extending therethrough, means operatively connecting said operating member and said stem, a laterally extending flange on said operating member and abutting the inside face of said plate member, and a spring in said chamber and urging said flange against said plate member.

10. An air valve of the character described comprising a hollow casing, a valve housing closing one end of said casing, said housing having a passageway therethrough, a valve in said casing and controlling said passageway, a valve member adjustably screw threaded in said housing and controlling said passageway, said housing having a chamber, a stem on said valve member extending into said chamber, a plate member overlying said stem and closing said chamber, said plate member having an aperture therethrough concentric with said stem, an operating member rotatably supported in said aperture and extending therethrough, means operatively connecting said operating member and said stem, a peripheral surrounding flange on said operating member, said flange having abutting engagement with the inside face of said plate member, an abutment member carried by said stem and positioned in said chamber, and a helical coil spring surrounding said stem, said spring being held under compression and having one end engaging said abutment member and its other end engaging said operating member.

11. In an air vent valve for a heating system, a casing including a hollow cast body portion, said casing having an air outlet port, means in said casing for controlling said port to prevent flow of the heating medium therethrough, said body having an externally extending nipple cast integral therewith, and a tubular insert member around which said nipple is cast to reenforce the nipple against breakage, said insert member having an enlarged outer end portion extending beyond said nipple, said outer end portion and said nipple being externally substantially cylindrical and of substantially the same external diameter such that said nipple and said portion may have a continuous external screw thread, the diameter and length of said outer end portion being such that the joint between said portion and the end of said nipple will be positioned within its internally screw threaded receiving port.

12. In an air vent valve for a heating system, a casing having an inlet and having an outlet port provided with a seat, an adjustable valve member cooperable with said port to control flow therethrough, said valve member being operable to vary the flow capacity of said port between capacity limits of a relatively large flow capacity and a relatively small flow capacity with said relatively small flow capacity being had when said valve member is seated, manually operable means for adjusting said valve member, and means providing a passage for said relatively small flow capacity.

13. In an air vent valve for a heating system, a casing having an inlet and having an outlet port provided with a seat, an adjustable valve member cooperable with said port to control flow therethrough, said valve member being operable to vary the flow capacity of said port between capacity limits of a relatively large flow capacity and a relatively small flow capacity with said relatively small flow capacity being had when said valve member is seated, and manually operable means for adjusting said valve member, said valve member having a slot cooperable with said port to provide a passage for said relatively small air flow capacity when said valve member is seated and cooperable with said port to increase the capacity of said passage when said valve member is moved away from its seat.

14. In an air vent valve for a heating system, a casing including a hollow body having a bottom wall with an opening therethrough, said casing having an inlet and having an outlet port, a valve member in said body and controlling said outlet port, a supporting means in said body for supporting said valve member, and a closure member closing the opening in the bottom wall of said body, said closure member fitting into said body and having a resilient flange portion in engagement with the inner wall surface of said body and held under tension to tightly secure said closure member to said body.

15. In a device of the character described, a valve member, a supporting means, a rotatable adjustment member supported by said means and having an end portion substantially flush therewith, said rotatable member being operatively connected to and for rotating said valve member, a slot in said end portion for tool engagement to rotate said rotatable member, indicia on said means cooperable with an outer end of said slot to indicate the position of said rotatable member relative to said means, and spring means interposed intermediate said members and operable to urge said members in a parting direction so that said end portion is maintained in said substantially flush position regardless of the setting of said rotatable member.

16. In an apparatus of the character described, a wall member having an aperture therethrough, an insert member in said aperture and having a passageway therethrough alined with said aperture, cooperating means on said insert member and said wall member and holding said insert member rigidly against rotation in said wall member aperture, one of said members having a continuous flange providing a continuous shoulder transverse to said passageway and facing the other of said members, said other member having an end portion terminating in close facing relation to said shoulder, said end portion and said flange providing a continuous surface of substantially circular cross-section, said continuous surface being screw-threaded, and means having screw-threaded engagement with the continuous surface screw-thread on said flange and said end portion, the threaded portion of said means extending on opposite sides of and having overlying closing relation to the joint between said end portion and said flange, said threaded portion also rigidly securing together said end portion and said flange.

17. In an apparatus of the character described, a wall portion having a tubular wall extension member, said portion and said member having an aperture therethrough, an insert member in said aperture and having a passageway therethrough alined with said aperture, means establishing direct interlocking engagement between said insert member and said wall portion so that rotary twisting strain on said insert member will be transmitted directly to said wall portion thereby to reenforce said tubular member, one of said members having a continuous flange providing a continuous shoulder transverse to said passageway and facing the other of said members, said other member having its free end wall transverse to said passageway and in close facing relation to said shoulder, said end portion and said flange providing a continuous surface of substantially circular cross-section, said continuous surface being screw-threaded, and means having screw-threaded engagement with the continuous surface screw-thread on said flange and said end portion, the threaded portion of said means extending on opposite sides of and having overlying relation to the joint between said end portion and said flange, said threaded portion also rigidly securing together said end portion and said flange.

18. In an apparatus of the character described, a tubular insert member having a passageway therethrough, said member having a surrounding continuous flange providing a transverse shoulder, a wall portion having a tubular extension, said portion and said extension being cast around said insert member with the free end portion of said extension in close facing relation to said shoulder, said insert member having direct interlocking engagement with said wall portion to hold said insert member in said extension, said free end portion and said flange each being of substantially circular cross-section and together providing a surface for a continuous external screw-thread so that said end portion and said flange can have screw-threaded engagement with the screw-threads of an internally screw-threaded aperture.

19. In an apparatus of the character described, a die-cast housing having a hollow tubular extension cast integral therewith, an insert member cast within the wall of said housing and the bore of said extension, means on said insert member in the plane of the housing wall and interlocking therewith to hold said insert members rigidly against rotation in said bore, an annular end flange on said insert member external of said extension and providing a shoulder in close facing relation to the end face of said extension, said flange and the end portion of said extension being of substantially circular cross-section and of substantially equal diameter at said shoulder and having a continuous screw-thread, a portion of said screw-thread being on said flange and a second portion of said screw-thread being on said end portion, and an internally screw-threaded member extending on both sides of the joint between said end portion and said flange and having its thread receiving said continuous thread such that flow between one of said continuous screw-threaded portions and said internally screw-threaded member is prevented.

GEORGE BETHUNE DUFFIELD.